June 11, 1935. A. J. HURT 2,004,283
FIXTURE FOR TURNING OR GRINDING OVALS
Filed Feb. 27, 1934 2 Sheets-Sheet 1
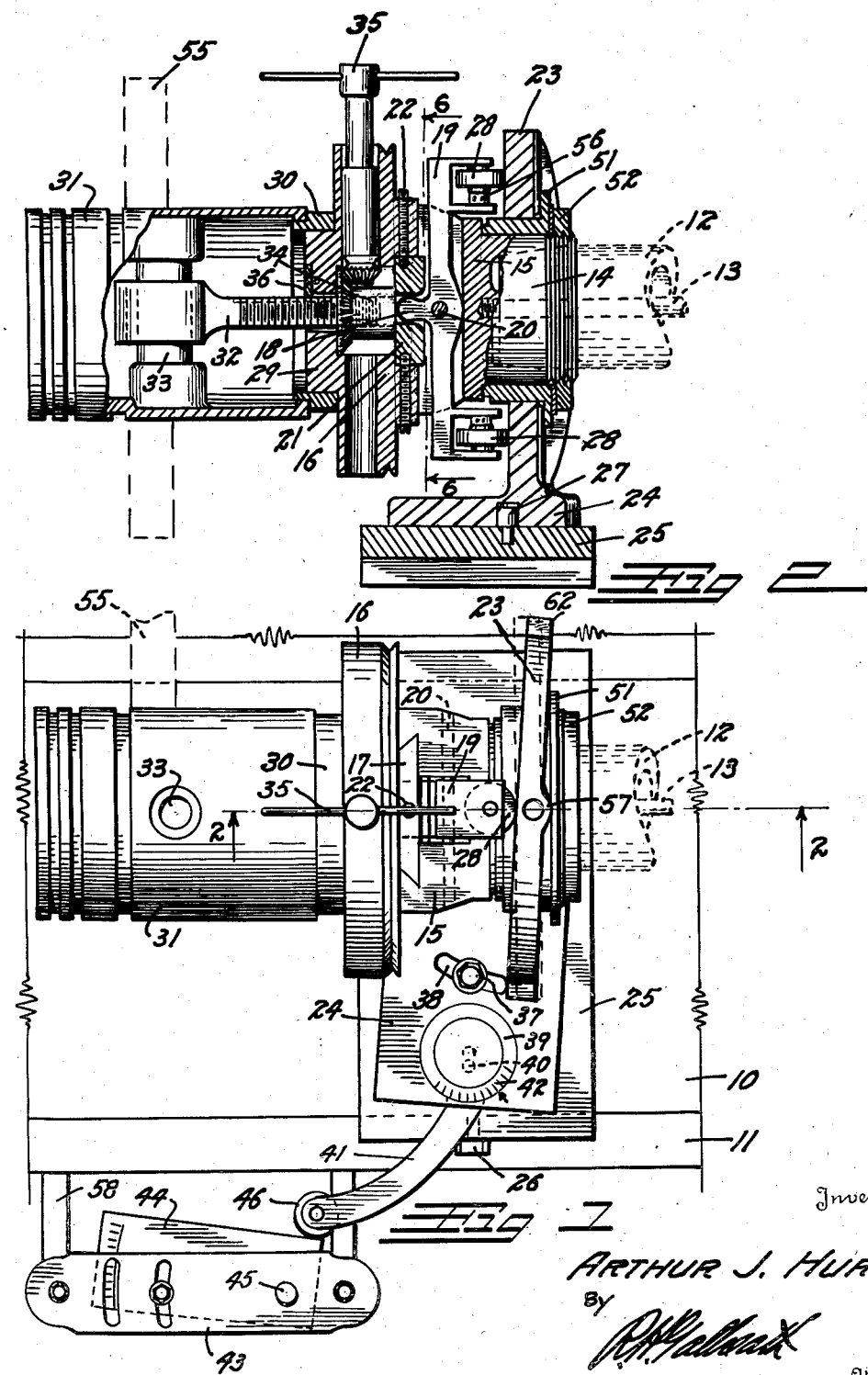
Inventor
ARTHUR J. HURT
By
Attorney

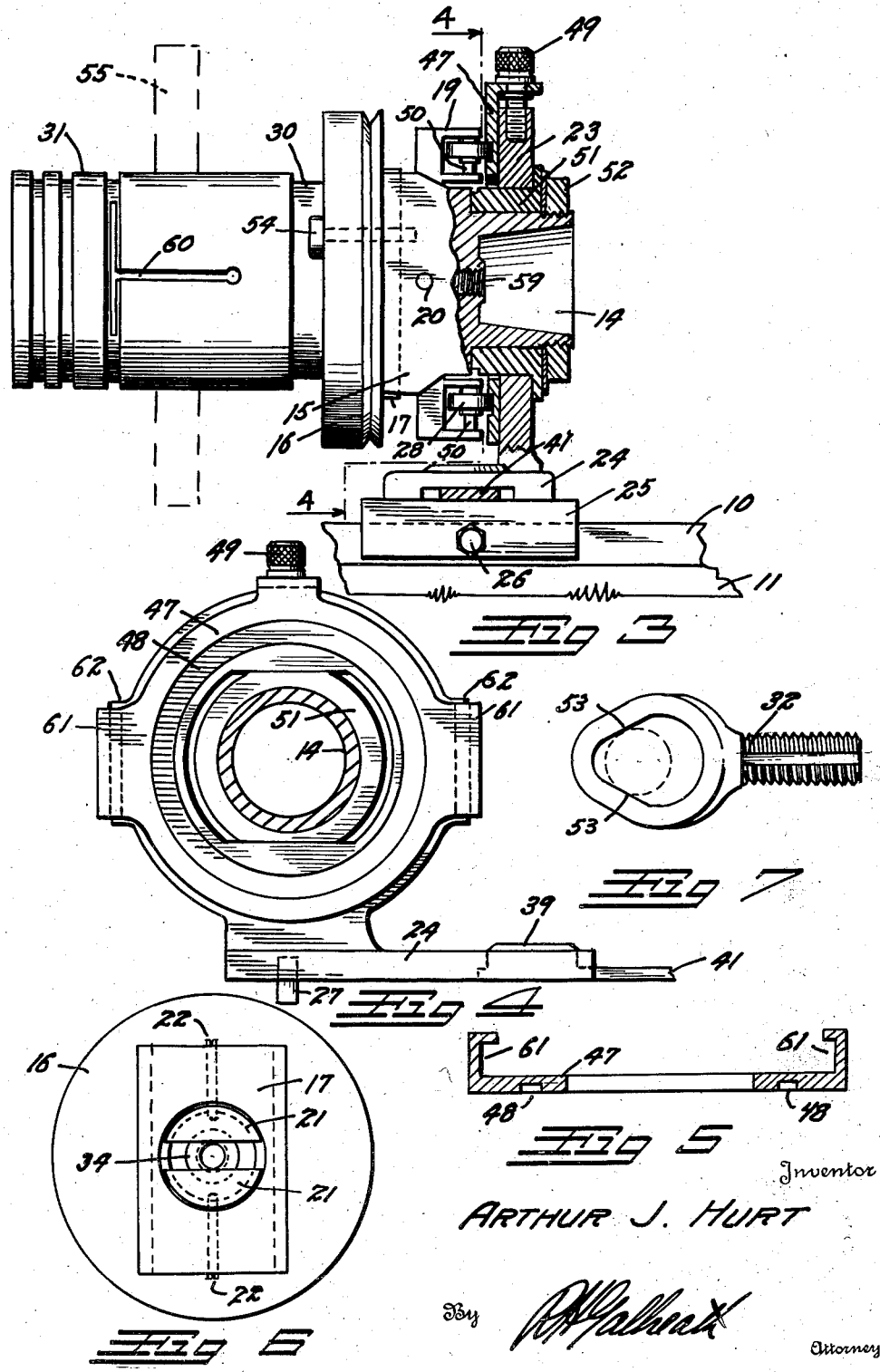

Patented June 11, 1935

2,004,283

UNITED STATES PATENT OFFICE 2,004,283

FIXTURE FOR TURNING OR GRINDING OVALS

Arthur J. Hurt, Denver, Colo.

Application February 27, 1934, Serial No. 713,074

12 Claims. (Cl. 51—232)

This invention relates to a grinding fixture for lathes or grinding machines for supporting and rotating an article against a grinding wheel upon a gyrating axis so that the ground surface will be other than circular, and, while particularly adaptable for grinding pistons it is, of course, not limited to this particular use.

The principal object of the invention is to provide a highly efficient device for use in conjunction with the spindle of a lathe or grinding machine to which a piston or other article can be quickly and accurately attached and which can be accurately regulated to impart a combined gyrating and rotating motion to the piston while it is in contact with the grinding wheel so as to produce any desired non-circular cross section.

Another object of the invention is to provide a device of this character which can be employed to produce a varying or tapering contour throughout the length of the article being ground.

A still further object is to provide means for grinding irregular contours such as "egg-shape" as well as all variations of ovals and ellipses.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawings and throughout the description.

In the drawings:—

Fig. 1 is a plan view of the invention in place on the spindle of a typical grinding machine.

Fig. 2 is a vertical longitudinal section therethrough, taken on the line 2—2, Fig. 1.

Fig. 3 is a side elevation partly in section of the device adapted for turning irregular or "egg-shaped" contours.

Fig. 4 is a vertical cross-section taken on the line 4—4, Fig. 3.

Fig. 5 is a horizontal detail section through the eccentric plate employed with the device.

Fig. 6 is a rear face view of the chuck member employed in the device, looking along the line 6—6, Fig. 2.

Fig. 7 is a detail view of the eye-bolt employed for holding the work upon the device.

The invention is applicable to any type of grinding machine or may be employed upon a lathe adaptable for grinding. The machine upon which it is used of course forms no part of the present invention. For the purposes of illustration, portions of a typical grinding machine are indicated, such as a slide table 10 slidably mounted upon a suitable supporting base 11. The table 10 carries the mechanism for supporting and rotating a grinding spindle 12. The usual grinding machine is arranged so that the bed 10 reciprocates transversely with respect to a grinding wheel 55 during the revolution of the spindle 12.

The invention comprises a head 15 having a socket boss 14 hollowed to receive the extremity of the spindle 12. A draw bar 13 is passed through the spindle and threaded into the head 15 so as to draw it snugly over and maintain it upon the spindle extremity. The head could be attached to the spindle in any desired manner such as by threading, etc. The head 15 is provided with a diametrically extending, dovetailed groove in its face, for receiving a dovetailed boss 17 formed on a chuck member 16. The boss 17 fits snugly into the dovetailed groove yet is sufficiently free to allow the chuck member to be moved diametrically of the head 15. The relative movement of the head is controlled by a tongue 18 formed on a rocking yoke 19.

The yoke 19 extends diametrically through the head 15 and is pivoted at the center thereof upon a laterally extending pivot pin 20. The tongue 18 of the yoke extends between two semi-circular bearing blocks 21 which rest in a counter-bore in the dove-tailed boss 17, set screws 22 are provided to take up any wear or lost motion between the tongue 18 and the bearing blocks 21.

It can be seen that with this arrangement any rocking motion of the yoke 19 upon the pivot 20 will be transmitted to move the axis of the chuck 16 laterally of the axis of the head 15 and spindle 12. The rocking motion is imparted by means of an angle plate 23. The angle plate 23 is formed with a foot 24 which is pivoted to a base 25 on a pivot stud 27. The base 25 is shaped to fit over the table 10 and is provided with a set screw 26 for locking it in the desired position thereon. The extremities of the yoke 19 carry bearing rollers 28 for contacting the face of the angle plate 23.

It can be readily seen that if the forward extremity of the base 24 is swung to the right it will position the angle plate 23 so that as the yoke 19 passes the vertical position it will be at right angles to the axis of rotation, and at the horizontal position, the rear roller 28 will have moved to the right while the forward roller 28 will have moved to the left. This causes the tongue 18 to push the chuck 16 rearwardly from the axis of rotation as the yoke approaches the horizontal and to pull it toward axial alignment as the yoke approaches the vertical. A locking screw 37 projects through an arcuate slot 38 in the base 24, by means of which the angle plate may be locked in any desired position.

The forward face of the chuck 16 is formed with a cylindrical boss 29 for receiving an adapter ring 30. Various adapter rings are supplied with the device to adapt it to receive pistons of various diameters. All of these rings fit snugly upon the cylindrical boss 29.

In the drawings a typical piston is illustrated at 31 with its wrist pin at 33. The piston is attached to the device by passing its wrist pin 33 through the eye of an eye-bolt 32. The stem of the eye-bolt 32 is threaded through a rotatable nut 34 located in a counterbore in the chuck member 16. The nut 34 is provided with bevel teeth which may be engaged by similar teeth on the extremity of a chuck key 35. The stem of the eye-bolt is longitudinally slotted to form a keyway into which a key 36 projects to prevent rotation of the eye-bolt.

It can be readily seen that by tightening the nut 34 with the key 35, the piston 31 will be drawn tightly against its adapter ring 30, and the ring will be drawn tightly against the chuck 16 so as to firmly lock the piston in a position concentric with the axis of the chuck.

As thus far described the device may be employed for grinding any desired oval or elliptical cross sections uniformly throughout the length of a piston. In use, the foot 24 is set to produce the desired angle on the plate 62 to give the necessary gyration. The piston is then brought against the grinding wheel 55, and the device started.

It will be noted that the key 36 is positioned so as to maintain the wrist pin 33 parallel with the yoke 19. Therefore the axis of the ellipse will always lie at right angles to the wrist pin so that the piston will be ground narrower at the wrist pin bosses than at right angles thereto. This eccentric grinding progresses uniformly throughout the length of the piston.

In certain types of pistons, especially with pistons having a T-slot such as shown at 60 in Fig. 3, it is desirable to grind the piston with an oval or elliptical cross section adjacent the wrist pin or T-slot and with a round or cylindrical cross section adjacent the skirt extremity. For such a use an eccentric dial disc 39 may be fitted into a bore through the foot 24. The disc 39 is eccentrically pivoted at 40 to the base 25 and is provided with an arm 41 by means of which it may be rotated. If the arm 41 is swung to the left it will cause the eccentric disc 39 to swing the forward extremity of the foot 24 to the right so as to bring the rocker plate 23 to the broken line position of Fig. 1, and, when swung to the left, will swing the plate 23 toward the solid line position of Fig. 1.

A gauge plate 43 is mounted upon the supporting base 11 by means of suitable brackets 58. This plate is provided with an adjustable plate 44 pivoted thereon at 45. The extremity of the arm 41 carries a roller 46 which contacts with the edge of the plate 44. In use, the upper portion of the skirt of the piston is positioned opposite the grinding wheel 55 and the arm 41 is swung to the point to give the maximum desired oval. The gauge 44 is then set to contact with the roller 46, so that, when the base 25 has moved to position the grinding wheel opposite the bottom of the piston, the arm 41 will be swung inwardly sufficiently to bring the plate 23 to the broken line position. The grinding is then started with the mechanism in the position of Fig. 1 and as the base moves to the left the roller 46 will gradually swing the arm 41 to the left and when the grinding wheel is opposite to the base of the piston it will be grinding a perfect circle.

In certain instances it is desired to grind the piston with an irregular or "egg-shaped" cross section so that it will have a larger radius on the thrust side thereof. This can be accomplished in the present invention by installing a track plate 47 on the face of the angle plate 23. The track plate is provided with a depressed track groove 48 in which the rollers 28 travel. The track plate is formed with flanged side slides 61 arranged to slide upon vertical shoulders 62 on the plate 23 and may be adjusted and set in any desired vertically eccentric position by means of a knurled screw 49. When set concentric with the axis of the spindle 12, the rollers will travel in a circle so as to produce a regular elliptical grind. When set eccentrically of the axis, the effect of the rollers at one side of the axis will be greater than the effect at the other side so as to produce an irregular elliptical grind. The rollers 28 are positioned on relatively long roller shafts 50 so that they are free to move in and out on the yoke 19 to follow any eccentricity of the track groove 48. The plate 23 is brought into firm engagement with the rollers 28 by means of a flanged collar 51 which slips over the socket boss 14 and is clamped thereon by means of a suitable ring nut 52 which is threaded onto the socket boss 14. The collar 51 bears on a vertical line along a vertical ridge 57 formed on the plate 23 so as not to interfere with the rocking or angular movement of the plate.

It is desired to call particular attention to the shape of the eye in the eye-bolt 32 which is illustrated in detail in Fig. 7. The opening in the eye of this bolt is sufficiently large to accommodate the largest expected wrist pin. Toward the outer extremity of the eye the sides thereof converge in two similar planes 53 which will contact with the wrist pin at two points so as to align it perfectly with the axis of the eye opening, regardless of its size. This is important since it is essential that axis of the ellipse be at right angles to the wrist pin of the piston.

When it is desired to employ the device for straight cylindrical grinding, the plate 23 is set at a zero or right angle position, and an aligning pin 54 may be inserted through the chuck member 16 into the head 15 to lock the two concentric with each other.

In order to reduce the number of adaptor rings 30 necessary, they could be shouldered on both faces so as to receive a piston of different diameter on each face.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A combination with a rotary spindle of a grinding machine, of a fixture attached to said spindle; a head on said fixture for holding work to be ground; and means for moving said head laterally of said fixture during each revolution of said spindle; and means for causing said means for moving to have a relatively greater effect during a portion of the revolution of said spindle.

2. A fixture for attachment to the spindle of a grinding machine for varying the distance between the work and the grinding element during the rotation of said spindle comprising: a head for attachment to said spindle; a chuck member carried by said head; means for attaching the work to said chuck member, said chuck member being radially movable upon said head; an angle plate surrounding said head with its surface inclined to the axis of rotation; and means coacting with the surface of said plate to control the lateral movement of said chuck member.

3. A fixture for attachment to the spindle of a grinding machine for varying the distance between the work and the grinding element during the rotation of said spindle comprising: a head for attachment to said spindle; a chuck member carried by said head; means for attaching the work to said chuck member, said chuck member being radially movable upon said head; an angle plate surrounding said head; a yoke pivotally mounted in said head; a bearing member at the extremity of said yoke adapted to contact with the surface of said angle plate; and a projecting member on said yoke contacting with said chuck member so as to move the latter in consequence of the pivotal movement of said yoke.

4. A fixture for supporting a piston upon the extremity of a rotating spindle so as to cause said piston to simultaneously rotate and gyrate comprising: a head for attachment to said spindle; a chuck member supported by said head, said chuck member being free to move diametrically of said head; means for attaching a piston to said chuck member; an angle plate surrounding said head; means for setting said plate at any desired angle to the axis of said spindle; and a rocking member pivoted in said head and operatively connected with said chuck member so as to move the latter diametrically in consequence of the angle of said angle plate.

5. A fixture for supporting a piston upon the extremity of a rotating spindle so as to cause said piston to simultaneously rotate and gyrate comprising: a head for attachment to said spindle; a chuck member supported by said head, said chuck member being free to move diametrically of said head; means for attaching a piston to said chuck member; an angle plate surrounding said head; means for setting said plate at any desired angle to the axis of said spindle; a yoke extending through said head; a pivot for said yoke at the center of said head; a tongue projecting from said yoke into said chuck member so as to communicate movement thereto; contact members at the extremities of said yoke bearing against said angle plate so as to move said chuck member in consequence of the angle of said angle plate.

6. A fixture for supporting a piston upon the extremity of a rotating spindle so as to cause said piston to simultaneously rotate and gyrate comprising: a head for attachment to said spindle; a chuck member supported by said head, said chuck member being free to move diametrically of said head; means for attaching a piston to said chuck member; an angle plate surrounding said head; means for setting said plate at any desired angle to the axis of said spindle; a yoke extending through said head; a pivot for said yoke at the center of said head; a tongue projecting from said yoke into said chuck member so as to communicate movement thereto; rollers carried on the extremities of said yoke; an eccentric plate carried by said angle plate having a track groove for said rollers; and means for varying the eccentric position of said eccentric plate so that said chuck member will be moved diametrically in consequence of both the angle of said angle plate and the eccentricity of said eccentric plate.

7. A fixture for supporting a piston upon the extremity of a rotating spindle so as to cause said piston to simultaneously rotate and gyrate comprising: a head for attachment to said spindle; a chuck member supported by said head, said chuck member being free to move diametrically of said head; means for attaching a piston to said chuck member; an angle plate surrounding said head; means for setting said plate at any desired angle to the axis of said spindle; a rocking member pivoted in said head and operatively connected with said chuck member so as to move the latter diametrically in consequence of the angle of said angle plate; bearing blocks in said chuck member; and a tongue formed on said rocking member passing between said bearing members so that the movements of said rocking member will be communicated to said chuck member through said blocks.

8. A fixture for supporting a piston upon the extremity of a rotating spindle so as to cause said piston to simultaneously rotate and gyrate comprising: a head for attachment to said spindle; a chuck member supported by said head, said chuck member being free to move diametrically of said head; means for attaching a piston to said chuck member; an angle plate surrounding said head; means for setting said plate at any desired angle to the axis of said spindle; a rocking member pivoted in said head and contacting at its extremities with the surface of said plate, said rocking member being operatively connected with said chuck member so as to move the latter diametrically in consequence of the angle of said angle plate; a foot formed on said angle plate; a base supporting said foot; means for locking said base in a pre-set position; and means for swinging said foot on said base so as to change the angle of said angle plate.

9. A fixture for supporting a piston upon the extremity of a rotating spindle so as to cause said piston to simultaneously rotate and gyrate comprising: a head for attachment to said spindle; a chuck member supported by said head, said chuck member being free to move diametrically of said head; means for attaching a piston to said chuck member; an angle plate surrounding said head; means for setting said plate at any desired angle to the axis of said spindle; a rocking member pivoted in said head and contacting at its extremities with the surface of said plate, said rocking member being operatively connected with said chuck member so as to move the latter diametrically in consequence of the angle of said angle plate; a foot formed on said angle plate; a base supporting said foot; means for locking said base in a pre-set position; means for swinging said foot on said base so as to change the angle of said angle plate; and means for actuating said means for swinging in consequence of axial movement of said base.

10. In a fixture for grinding pistons: means for attaching said piston to said fixture comprising: a cylindrical projection on said fixture for receiving the skirt of said piston; an eye bolt projecting from said fixture for receiving the wrist pin of said piston, said eye-bolt being threaded within said fixture; a nut carried in said fixture on the threaded portion of said eye-bolt; and means for rotating said nut from the exterior of said fixture so as to draw said piston against said fixture.

11. In a fixture for grinding pistons: means for attaching said piston to said fixture comprising: a cylindrical projection on said fixture for receiving the skirt of said piston; an eye bolt projecting from said fixture for receiving the wrist pin of said piston, said eye bolt being threaded within said fixture; a nut carried in said fixture on the threaded portion of said eye bolt; means for rotating said nut from the exterior of said fixture so as to draw said piston against said fixture, the wrist pin opening in said eye bolt being larger than said wrist pin; and two inclined surfaces in said opening for contacting said wrist pin as said nut is tightened.

12. In a fixture for grinding pistons: means for attaching said piston to said fixture comprising: a cylindrical projection on said fixture for receiving the skirt of said piston; an eye bolt projecting from said fixture for receiving the wrist pin of said piston, said eye bolt being threaded within said fixture; a nut carried in said fixture on the threaded portion of said eye bolt; means for rotating said nut from the exterior of said fixture so as to draw said piston against said fixture; and means for preventing rotation of said eye bolt.

ARTHUR J. HURT.